United States Patent Office 2,833,835
Patented May 6, 1958

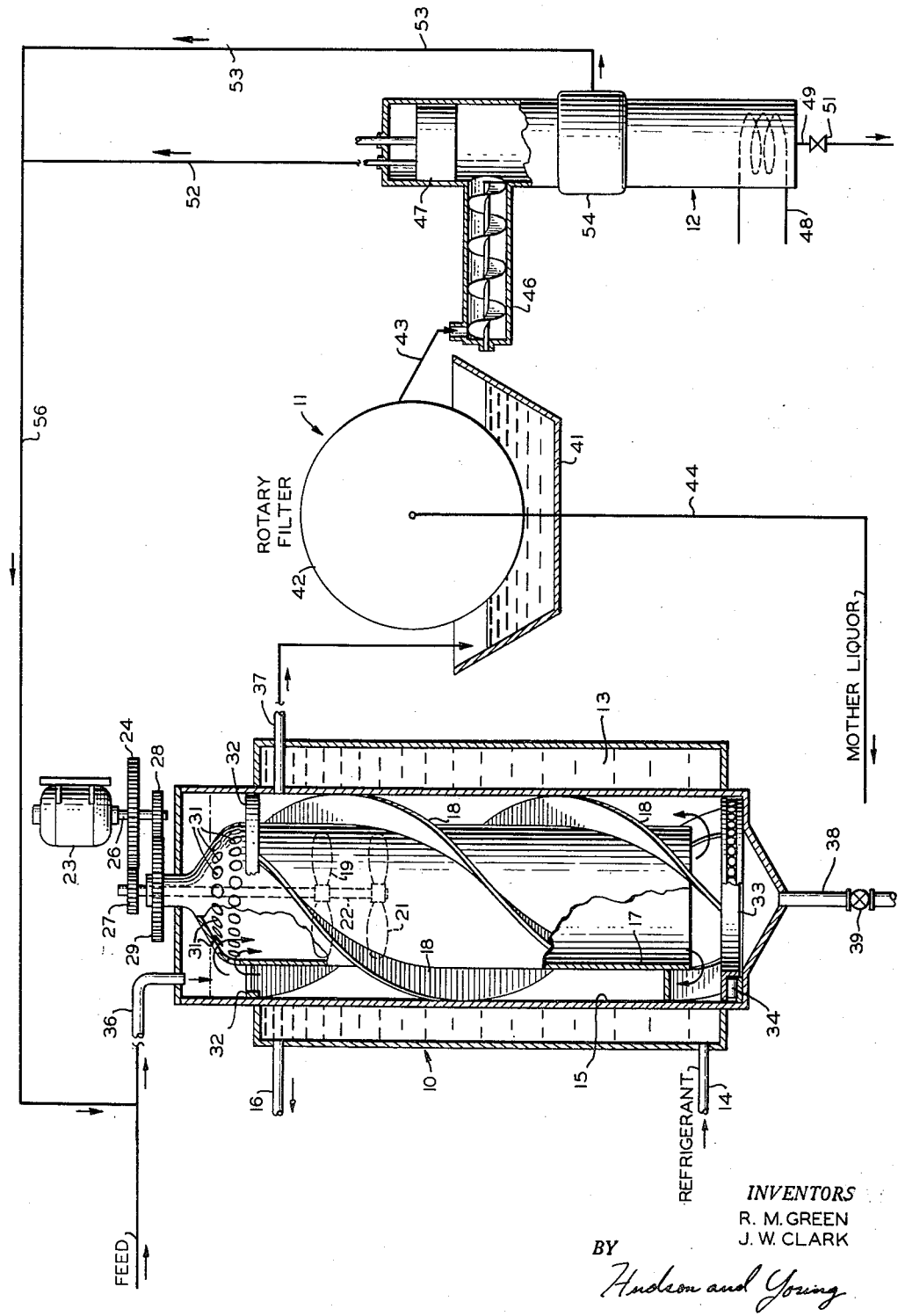

2,833,835
CONTINUOUS CIRCULATING CRYSTALLIZATION PROCESS AND APPARATUS

Richard M. Green and Joseph W. Clark, Borger, Tex., assignors to Phillips Petroleum Company, a corporation of Delaware Application November 19, 1954, Serial No. 469,976

14 Claims. (Cl. 260—674)

This invention relates to a method of forming crystals from a solution containing crystallizable material. In a further aspect this invention relates to apparatus for carrying out this process. In a further aspect this invention relates to a crystallizer for forming large crystals comprising a tube mounted within a crystallization zone, scraper blades attached to this tube adapted to scrape the walls upon which crystals deposit, and impeller means for circulating a liquid slurry past the heat exchange area of said crystallization zone. In a further aspect this invention relates to a process for the purification of materials by crystallization.

The use of crystal purification columns of the type disclosed in Schmidt Re. 23,810, Weedman application Serial No. 166,992, now Patent No. 2,747,001, filed June 9, 1950, and McKay application Serial No. 375,850, filed August 24, 1953, has become widespread. Such columns provide a method for producing very pure compounds, frequently above 99 percent purity. Many different systems have been employed to prepare the crystal feed to such purification columns. For efficient operation it is necessary that the crystals fed to the column be of relatively large size. One form of apparatus which has been used to prepare crystals is a scraped surface chiller. A difficulty resulting from the use of such a chiller is that the crystals are of very small size. It has been suggested that the effluent from such a chiller be subjected to a holding operation in order to permit growth of crystal size. However, this involves additional equipment and the resultant additional expense, in addition to the fact that a considerable length of time is required in such holding tanks because the unaided process of melting and recrystallizing is slow.

The following are objects of this invention.

An object of this invention is to provide an improved process for the production of crystals. A further object of this invention is to provide apparatus for producing such crystals. A further object of this invention is to provide a method for forming crystals comprising maintaining a comparatively large volume of crystal slurry in motion, adding feed to this volume of circulating slurry thereby increasing the size of the crystals present preferentially to forming new and small crystals by growth of crystals already present, and maintaining good heat transfer to the circulating slurry by preventing a layer of crystals from forming upon heat exchange surface. A further object of this invention is to provide a process for the purification of materials by crystallization.

Other objects and advantages of this invention will be apparent to one skilled in the art upon reading this specification.

Accompanying and forming a part of this specification is a drawing illustrating schematically the apparatus of this invention and showing, partly in section, the improved chiller which we have invented.

We have discovered an improved process of and apparatus for forming crystals. This comprises modifying a scraped surface chiller so that a stream of the crystal slurry passes by the heat exchange surface at a rapid rate of speed. Feed material introduced to this stream is rapidly cooled and the crystallizable components thereof tend to deposit on existing crystal nuclei rather than forming new nuclei. Furthermore, circulation at a high rate reduces the temperature gradient in the apparatus.

The invention can best be understood from the drawing accompanying this specification wherein the principal components for the separation process comprise the chiller 10, a rotary filter 11 and a purification column 12.

The crystallizer 10 comprises an outer chamber 13 through which heat exchange material is passed, conduits 14 and 16 providing for introduction of and removal of the heat exchange material. In the usual operation this heat exchange material comprises a refrigerant although heat is added for materials with negative solubility coefficients, i. e. compounds which become less soluble as the temperature of the solvent increases. Inside of the chiller there is provided a tube 17, this tube being rotatably mounted within the chiller and provided with at least one scraper 18 adapted to scrape the wall 15 of the heat exchanger. The area of wall 15 contacted by the scraper blades corresponds substantially to the area contacted by the heat exchanger. Positioned within tube 17 we provide, in the preferred modification, impellers 19 and 21, these being mounted upon shaft 22. In the drawing, we have illustrated a method by which both tube 17 and shaft 22 can be driven from a single source of power 23. As will be pointed out hereafter it is desirable that the impeller operate at a very high speed while the tube rotates slowly. Although separate drive means could be used for these actuated elements, a single power source can be used. If a large gear 24 is provided on the motor shaft 26 for driving a small gear 27 on impeller shaft 22, and if a small gear 28 is provided on motor shaft 26 for driving a large gear 29 on tube 17, it will be seen that the tube turns slowly while the impeller turns rapidly, both in the same direction. The upper end of tube 17 is provided with a series of openings 31 of a size sufficient to permit flow of the crystal slurry therethrough. One end of scraper blades 18 is attached to an annular ring 32 and the other end of these blades is attached to an open bearing plate 33, this bearing plate riding upon roller bearings 34. A feed inlet conduit 36 is provided and a slurry outlet conduit 37 is also provided. A cleanout conduit 38, containing valve 39, extends from the lower end portion of the chiller. Conduit 38 can be used as an alternate slurry outlet.

The remainder of the apparatus, shown to complete the disclosure of the entire process, comprises the rotary filter 11 and the crystal purification column 12. Conduit 37 extends into the pan 41 in which the rotating filter member 42 rotates. Conduit 43 conveys material from the rotary filter to the purification column 12 and conduit 44 is provided to remove mother liquor obtained in the filtering operation. Conduit 43 communicates with column feed conduit 46, this feeding the solid material to the purification column 12 wherein it is moved downwardly by piston 47. Means for supplying heat to the lower portion of column 12 is provided, such as a heat coil 48. Product removal conduit 49 is shown extending from the lower portion of column 12, this conduit being provided with valve 51. Recycle conduits 52 and 53 are provided and either or both of these conduits can be utilized in a specific adaptation of this apparatus. In operation, heating coil 48 melts the solid material and a portion of this is withdrawn as the product, the remainder being forced upwardly displacing occluded impurities from the solid. Conduit 52 is utilized when a porous piston 47 is used and, if a solid piston is used, the liquid can be removed through conduit 53. Conduit 53 communicates with liquid collection means 54, a filter being provided in the wall of the purification column for removal of liquid therefrom. In this drawing conduits 52 and 53 join to form conduit 56. Since the liquid removed from this column is usually relatively rich in the material which is being purified, conduit 56 is shown communicating with feed conduit 36.

In the drawing we have shown a vertical crystallizer 10 but it will be understood that this piece of apparatus could be operated in a horizontal or, in fact, in any other position. In horizontal operation it is preferable to have the slurry removal conduit 37 at the opposite end from feed conduit 36. Drain conduit 38 should, of course, communicate with the then lower portion of the crystallizer. Furthermore, equivalent slurry impeller means can be substituted for the propeller blades 19 and 21. Turbine blades can be used as well as other kinds of pumps. When the crystallizer is operated in the vertical position, as shown in the drawing, an air jet can be used to circulate the slurry, such an air jet introducing air into the bottom of the crystallizer, the crystallizer being provided with a vent at the top thereof.

In the operation of this crystallizer the slurry containing zone is filled with feed material and refrigerant is circulated through the zone 13. When the temperature in the crystallizer becomes low enough crystals start to form. When these reach a suitable size, the apparatus can be operated continuously to provide a slurry feed for the rotary filter 11. This is done by removing a portion of the slurry through conduit 37 or conduit 38 and introducing an equivalent amount of feed liquid through conduit 36. The crystallizer should be of sufficient size to give a residence time of at least 30 minutes, a minimum time of 45 minutes frequently being more suitable. The maximum residence time is of lesser importance but is usually in the range of 2 to 4 hours.

The crystallizer is constructed so as to provide an annular space between tube 17 and the wall 15 of the crystallizer of smaller size than that of the tube. We prefer to have the cross section area of the annulus ⅓ to ½ of the cross section area of the tube. This provides for the relatively high speed necessary along the walls of the crystallizer. This speed is necessary since it tends to prevent deposition of solid material on the wall 15 of the crystallizer. The linear speed in the annular section is generally in the range 0.5 to 20 feet per second, preferably 2 to 10 feet per second. The majority of the crystallization takes place inside of tube 17. The circulation reduces the temperature gradient at the heat exchange surface and this minimizes crystallization and nucleation in the annulus.

When the crystallizer is operated in a vertical position as shown in the drawing there is an additional factor which must be considered in determining the speed of liquid flow through the apparatus. It will be evident that, for efficient operation, the slurry flow must be at a speed in excess of the settling rate of crystals in the slurry. Otherwise solid material will collect in the lower portion of the apparatus.

The tube containing the scraper blades is rotated slowly and, generally, at such a speed to clean the refrigerated tube wall once every 5 to 60 minutes, preferably every 15 to 20 minutes. Since the clean wall surface offers an area for the formation of small crystal nuclei, the wall should not be cleaned oftener than necessary to prevent excessive crystal buildup. The maximum time between each operation of cleaning the wall is a function of the amount of crystal buildup thereon because a layer of crystals on this wall reduces the heat transfer therethrough to a great extent.

*Example*

The crystallizer of this invention can be used for forming large crystals of para-xylene from a feed material which is a conventional xylene mixture containing 16 to 18 percent para-xylene; the remainder being meta-xylene, ortho-xylene, and ethyl benzene. The crystallizer, having a capacity of 6 gallons, is first filled and cooled. When the temperature of the slurry reaches −100° F., feed is added continuously at a rate of 8 gallons per hour, providing a residence time of 45 minutes. Large crystals are formed and, following 40 minutes of operation, the temperature in the crystallizer is at −85° F., the temperature of the refrigerant being −112° F. The heat transfer coefficient (B. t. u./hr./sq. ft.) is 28, with substantially no deposit on the refrigerant wall. With scraping every 40 minutes, this heat transfer coefficient is maintained at substantially a constant figure and large crystals can be obtained. If the scraper is stopped and the other conditions maintained the same, the heat transfer coefficient drops rapidly and, after 6 hours is reduced to 8 B. t. u./hr./sq. ft. This low heat transfer coefficient is the result of the building up of a layer of crystals on the refrigerant wall approximately 0.1 inch in thickness.

From these data it is apparent that agitation alone does not provide a method for continuous production of the crystal slurry. It would be necessary to shut down the system and melt off the accumulated wall layer in order that an effective heat transfer coefficient be maintained. However, with the scraping, the apparatus will function in a continuous manner. Using this apparatus it is possible to obtain crystals as large as 0.2 x 0.6 mm. with some 0.6 x 0.6 mm. clusters being obtained. For best results in the purification column, crystals should have an average maximum dimension of at least 0.2 mm. Large crystals have the advantage of providing less surface per unit weight on which mother liquor is occluded.

The slurry from the crystallizer is introduced into pan 41 of a rotary filter, such as an Oliver filter. The filter cake formed on this filter is removed and introduced by conduits 43 and 46 into crystal purification column 12. By the operation of piston 47 a compact mass of crystals is moved downwardly in the column. Heat supplied by heater 48 melts these crystals and a portion is withdrawn as product through conduit 49. A portion of the melt is forced upwardly in the column and this portion displaces occluded impurities from the compact mass and the resulting liquid is removed from the upper portion of the column, is mixed with the feed, and introduced again into the crystallizer. For a more complete description of the operation of the crystal purification column, attention is directed to the prior art set forth above.

This crystallizer represents a considerable advantage over the use of the conventional scraped surface chiller operation in which the feed is passed through a cooling zone to form crystals in a one-pass operation. In such a method, a large number of nuclei always form at the point where crystallization begins. The present invention overcomes this inherent disadvantage by cooling the feed to the crystallization temperature in the presence of existing crystals. Therefore, when the crystallization temperature is reached, nuclei are already present on which the material can deposit.

The process and apparatus of our invention are applicable to a vast number of separations. The invention is applicable to, in general, mixtures of compounds which are difficult to separate by conventional means such as fractional distillation. The invention is applicable to mixtures which form eutectics. From a consideration of the phase diagram of a binary system which forms a eutectic it is obvious that either component (depending upon the composition of the specific mixture) can be separated by freezing until the composition of the mother liquor reaches the approximate eutectic point. It is also apparent that effective separation of the components can be made from systems where the concentration of one component is relatively low. In order to illustrate a few of the systems to which the invention is applicable, the following compounds are grouped with respect to their boiling points:

| | B. P., °C. | F. P., °C. |
|---|---|---|
| Group A: | | |
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-Dimethylpentane | 79 | −125 |
| 3,3-Dimethylpentane | 86 | |
| Methyl ethyl ketone | 79.6 | −86.4 |
| Methyl propionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |
| Group B: | | |
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | 107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |
| Group C: | | |
| Toluene | 110.8 | −95 |
| Methylcyclohexane | 100.3 | −126.3 |
| 2,2,3,3-Tetramethyl butane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |
| Group D: | | |
| Aniline | 184.4 | −6.2 |
| Toluene | 110.8 | −95 |
| Benzene | 80.0 | 5.5 |
| Group E: | | |
| Carbon tetrachloride | 77 | −22.8 |
| Chloroform | 61 | −63.5 |
| CS$_2$ | 46.3 | −108.6 |
| Acetone | 56.5 | −95 |
| Group F: | | |
| ortho-Xylene | 144 | −27.1 |
| meta-Xylene | 138.8 | −47.4 |
| para-Xylene | 138.5 | 13.2 |
| Group G: | | |
| ortho-Cymene | 175.0 | −73.5 |
| meta-Cymene | 175.7 | <−25 |
| para-Cymene | 176.0 | −73.5 |

Systems consisting of any combination of two or more of the components within any one of the groups may be separated by the process of the invention as well as systems made up of components selected from different groups; for example, benzene may be separated from a benzene-n-hexane or n-heptane system in which the benzene is present in an amount greater than the eutectic concentration. Benzene may also be separated from a mixture of toluene and/or aniline. Multi-component systems which may be effectively separated so as to recover one or more of the components in substantially pure form include 2,2-dimethylpentane, 2,4-dimethylpentane, 2,2,3-trimethylbutane; methyl cyclohexane, 2,2,4-trimethylpentane; and carbon tetrachloride, chloroform, acetone. The invention is also applicable to the separation of individual components from a system of cymenes.

It should be understood that many so-called binary systems also include small percentages of one or more other compounds as impurities which may be practically disregarded as far as operation of the process is concerned since they do not freeze out with the crystals but are retained in the mother liquor.

Our invention can also be used for the separation and purification of food products, such as vegetable juices, fruit juices, such as orange juice, and beverages, such as wine, beer, coffee, tea, etc.

It will be apparent that various modifications in addition to those set forth above can be made in this process and apparatus by those skilled in the art while still carrying out the essential features of our invention.

We claim:

1. Apparatus for continuously forming crystals in a slurry, comprising a closed chamber; a heat exchange jacket surrounding said chamber, a tube rotatably mounted within said chamber constructed and adapted to permit liquid flow between the space inside of said tube and the space between said tube and said chamber at each end of said tube; means to drive said tube; at least one scraper blade attached to said tube adapted to scrape the inner wall of said chamber; impeller means adapted to circulate material around said tube in a longitudinal direction; means to drive said impeller; a feed material inlet conduit communicating with the space between said tube and said chamber; and an outlet conduit communicating with the space between said tube and said chamber.

2. The apparatus of claim 1 associated with a crystal purification system comprising means to separate crystals from said slurry and a crystal purification column.

3. Apparatus for continuously forming crystals of large size in a slurry, comprising a closed chamber; a heat exchange jacket surrounding said chamber; a tube rotatably mounted within said chamber constructed and adapted to permit liquid flow between the space inside of said tube and the space between said tube and said chamber at each end of said tube; means to drive said tube; at least one scraper blade attached to said tube adapted to scrape the inner wall of said chamber; at least one impeller rotatably mounted within said tube; means to drive said impeller; a feed material inlet conduit communicating with the space between said tube and said chamber; and an outlet conduit communicating with the space between said tube and said chamber.

4. Apparatus for continuously forming crystals of large size in a slurry, comprising a substantially vertically disposed closed chamber; a heat exchange jacket surrounding said chamber; a tube rotatably mounted within said chamber constructed and adapted to permit flow between the space inside of said tube and said chamber at each end of said tube; at least one scraper blade attached to said tube adapted to scrape the inner wall of said chamber; at least one impeller rotatably mounted within said tube; means to drive said tube and said impeller; a feed material inlet conduit extending into the upper end portion of said chamber; and an outlet conduit extending from the upper end portion of said chamber.

5. Apparatus for continuously forming crystals of large size in a slurry, comprising a substantially vertically closed chamber; a heat exchange jacket surrounding said chamber; a tube rotatably mounted within said chamber constructed and adapted to permit liquid flow between the space inside of said tube and the space between said tube and said chamber at each end of said tube; a plurality of scraper blades attached to said tube adapted to scrape the inner wall of said chamber; a plurality of impellers rotatably mounted within said tube; means to drive said tube and said impellers; a feed inlet communicating with the upper end portion of said chamber; a first outlet conduit communicating with the upper end of said chamber; and a second outlet conduit communicating with the lower end portion of said chamber.

6. Apparatus for continuously forming crystals in a slurry, comprising a closed chamber, a heat exchange jacket surrounding said chamber; a tube rotatably mounted within said chamber constructed and adapted to permit liquid flow between the space inside of said tube and the space between said tube and the said chamber at each end of the tube, the cross section area of the space between said tube and the said chamber being smaller than the cross section area of said tube, means to drive said tube; at least one scraper blade attached to said tube adapted to scrape the inner wall of said chamber; impeller means adapted to circulate material around said tube in a longitudinal direction; means to drive said impeller; a material inlet conduit communicating with the space between said tube and said chamber; and an outlet conduit communicating with the space between said tube and said chamber.

7. A continuous process for forming a crystal slurry comprising introducing liquid feed to a circulating slurry in a crystal forming zone containing a heat exchange surface, said slurry circulating along a path within said zone but isolated from said heat exchange surface and returning adjacent said heat exchange surface, the speed of said slurry being sufficient to minimize deposition of crystals on said heat exchange surface; periodically removing crystals deposited upon said heat exchange surface; adding feed to said circulating slurry; and withdrawing a portion of said crystal slurry for further desired treatment.

8. A continuous process for forming a crystal slurry from a solution comprising circulating in a crystal forming zone a crystal slurry at a speed in excess of the settling rate of solids in said slurry longitudinally past a heat exchange surface, the return flow of said liquid being along a path within said zone but isolated from said flow past said heat exchange surface, the speed of said slurry being sufficient to minimize deposition of crystals on said heat exchange surface; periodically removing crystals deposited upon said heat exchange surface; adding feed to said circulating slurry; and withdrawing a portion of said crystal slurry for further desired treatment.

9. A continuous process for forming a crystal slurry from a solution, comprising circulating in a crystal forming zone a crystal slurry past a heat exchange surface at a linear velocity of 0.5 to 20 feet per second, the return flow of said liquid being along a path within said zone but isolated from said flow past said heat exchange surface, said speed of said slurry being sufficient to minimize deposition of crystals on said heat exchange surface; removing crystals deposited on said heat exchange surfaces at intervals from 5 to 60 minutes; adding feed to said circulating slurry and allowing the crystallizable component of the feed to deposit on crystal nuclei already formed, and withdrawing a portion of said crystal slurry for further desired treatment, the feed and withdrawal rates being such that an average residence time of 30 minutes to 4 hours is maintained.

10. A continuous process for forming a crystal slurry from a solution, comprising circulating in a crystal forming zone a crystal slurry past a heat exchange surface at a linear velocity of 2 to 10 feet per second, the return flow of said liquid being along a path within said zone but isolated from said flow past said heat exchange surface, said speed of said slurry being sufficient to minimize deposition of crystals on said heat exchange surface; removing crystals deposited on said heat exchange surfaces at intervals from 15 to 20 minutes; adding feed to said circulating slurry and allowing the crystallizable component of the feed to deposit on crystal nuclei already formed, and withdrawing a portion of said crystal slurry for further desired treatment, the feed and withdrawal rates being such that an average residence time of 45 minutes to 2 hours is maintained.

11. The process of claim 10 in which said liquid mixture comprises para- and meta-xylenes.

12. The process of claim 11 in which para-xylene is separated as a pure product.

13. The process of claim 10 in which said liquid mixture comprises a mixture of para-, ortho-, and meta-xylene.

14. The process of claim 13 in which para-xylene is separated as the pure product.

References Cited in the file of this patent

UNITED STATES PATENTS

| 2,552,525 | Wenzelberger | May 15, 1951 |
| 2,617,273 | Findlay | Nov. 11, 1952 |
| 2,672,487 | Tegge et al. | Mar. 16, 1954 |
| 2,683,178 | Findlay | July 6, 1954 |

FOREIGN PATENTS

| 460,834 | Great Britain | Feb. 4, 1937 |